US010506072B2

(12) United States Patent
Sysoev et al.

(10) Patent No.: US 10,506,072 B2
(45) Date of Patent: Dec. 10, 2019

(54) PASSING LISTENER SOCKETS BETWEEN WEB SERVER PROCESSES

(71) Applicant: NGINX, Inc., San Francisco, CA (US)

(72) Inventors: Igor Sysoev, Moscow (RU); Valentin Bartenev, Moscow (RU); Nikolay Shadrin, San Francisco, CA (US); Maxim Romanov, Moscow (RU)

(73) Assignee: F5 Networks, Inc., Seattle, WA (US)

( * ) Notice: Subject to any disclaimer, the term of this patent is extended or adjusted under 35 U.S.C. 154(b) by 60 days.

(21) Appl. No.: 15/961,799

(22) Filed: Apr. 24, 2018

(65) Prior Publication Data

US 2019/0327332 A1 Oct. 24, 2019

(51) Int. Cl.
*H04L 29/08* (2006.01)
*H04L 29/06* (2006.01)

(52) U.S. Cl.
CPC .............. *H04L 67/32* (2013.01); *H04L 29/06* (2013.01); *H04L 67/02* (2013.01); *H04L 69/329* (2013.01)

(58) Field of Classification Search
CPC ....... H04L 67/32; H04L 67/02; H04L 69/329; H04L 67/2852; H04L 67/2861; H04L 41/082; H04L 61/2528; H04L 61/6013; H04L 41/069; H04L 41/0836
See application file for complete search history.

(56) References Cited

U.S. PATENT DOCUMENTS

| | | | |
|---|---|---|---|
| 6,839,732 B1 * | 1/2005 | Vincent | H04L 29/06 707/999.01 |
| 8,209,403 B2 | 6/2012 | Szabo et al. | |
| 9,448,827 B1 * | 9/2016 | Allen | G06F 9/45533 |
| 2008/0155103 A1 * | 6/2008 | Bailey | G06F 9/544 709/227 |
| 2008/0270422 A1 * | 10/2008 | Craft | G06F 11/1438 |
| 2008/0270829 A1 * | 10/2008 | Craft | G06F 11/1438 714/15 |
| 2010/0082816 A1 * | 4/2010 | Kharat | G06F 9/4856 709/226 |
| 2018/0007162 A1 * | 1/2018 | Olmsted-Thompson | H04L 67/2852 |

(Continued)

OTHER PUBLICATIONS

"Envoy Proxy—Home," 2017, 5 pages, [Online] [Retrieved on Mar. 12, 2018] Retrieved from the Internet<URL:https://lyft.github.io/envoy/docs/>.

(Continued)

*Primary Examiner* — Vivek Srivastava
*Assistant Examiner* — Muhammad Raza
(74) *Attorney, Agent, or Firm* — Pepper Hamilton LLP

(57) ABSTRACT

Passing a reference to a first socket from a first process to a second process within a computing environment includes opening, by the first process, a second socket within the computing environment. The second socket is represented by a file in a first file system of the first process. The first process transmits a reference to the first socket to the second socket. A second file system of the second process is mapped to include the file representing the second socket. The second process reads the reference to the first socket from the file representing the second socket mapped to the second file system. The second process references the first socket using the reference to the first socket read from the file.

15 Claims, 5 Drawing Sheets

(56) References Cited

U.S. PATENT DOCUMENTS

2018/0074842 A1* 3/2018 Fu .......................... G06F 8/65

OTHER PUBLICATIONS

"Use Volume | Docker Documentation," Docker Inc., 2018, 10 pages, [Online] [Retrieved on Mar. 12, 2018] Retrieved from the Internet<URL:https://docs.docker.com/engine/admin/volumes/volumes/>.

Mouat, A., "Understanding Volumes in Docker," Container Solutions Blog, Dec. 9, 2014, 20 pages, [Online] [Retrieved on Mar. 12, 2018] Retrieved from the Internet<URL:http://container-solutions.com/understanding-volumes-docker/>.

"Announcing NGINX Plus R15" retrieved from the internet: https://www.nginx.com/blog/nginx-plus-r15-released/?_ga=2.151600313.1097175886.1565964481-2118493805.1565964481, (Apr. 10, 2018).

"Controlling nginx", retrieved from the internet: https://inginx.org/en/docs/control/.html (Nov. 20, 2011).

\* cited by examiner

PASSING LISTENER SOCKETS BETWEEN WEB SERVER PROCESSES

BACKGROUND

1. Field of the Invention

This invention pertains in general to web server architectures and in particular to processing connection requests within a web server.

2. Description of the Related Art

A web server processes requests from clients in order to support a web site. Typically, the web server receives and accepts a connection request from a client, services the request to produce a response, and then forwards the response to the requesting client. For example, the web server can receive a request for a web page and provide the web page in response.

A busy web server can receive hundreds or even thousands of requests concurrently. The web server must accept the requests, and then service the requests in a timely manner. Otherwise, the web site provided by the web server may appear unresponsive and provide poor quality of service.

An issue arises when the web server must be temporarily taken out of service for maintenance or other reasons. Requests from the clients will continue to arrive while the web server is out of service, and these requests should be accepted in order to support the web site. One technique for addressing this issue is to switchover from a first web server to a second web server while the first web server is out of service. However, this technique can still cause performance disruptions at the web site. Connection requests from clients received during the switchover period may not be received by either web server. The second web server may encounter an error upon startup and fail to service requests. Connection requests received but not serviced by the first web server may be dropped when the first web server is taken out of service. All of these issues negatively impact the quality of service provided by the web site.

SUMMARY

The above and other needs are met by methods, computer-readable storage media, and systems for passing a reference to a first socket from a first process to a second process within a computing environment.

One aspect provides a computer-implemented method for passing a reference to a first socket from a first process to a second process within a computing environment. The first process opens a second socket within the computing environment. The second socket is represented by a file in a first file system of the first process. The first process transmits a reference to the first socket to the second socket. A second file system of the second process is mapped to include the file representing the second socket. The second process reads the reference to the first socket from the file representing the second socket mapped to the second file system. The second process references the first socket using the reference to the first socket read from the file.

Another aspect provides a non-transitory computer-readable storage medium storing executable computer program instructions for passing a reference to a first socket from a first process to a second process within a computing environment. The computer program instructions open, by the first process, a second socket within the computing environment. The second socket is represented by a file in a first file system of the first process. The first process transmits a reference to the first socket to the second socket. A second file system of the second process is mapped to include the file representing the second socket. The second process reads the reference to the first socket from the file representing the second socket mapped to the second file system. The second process references the first socket using the reference to the first socket read from the file.

Still another aspect provides a system for passing a reference to a first socket from a first process to a second process within a computing environment. The system includes a computer processor and a non-transitory computer-readable storage medium storing executable computer program instructions that when executed by the computer processor perform actions including opening, by the first process, a second socket within the computing environment. The second socket is represented by a file in a first file system of the first process. The first process transmits a reference to the first socket to the second socket. A second file system of the second process is mapped to include the file representing the second socket. The second process reads the reference to the first socket from the file representing the second socket mapped to the second file system. The second process references the first socket using the reference to the first socket read from the file.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
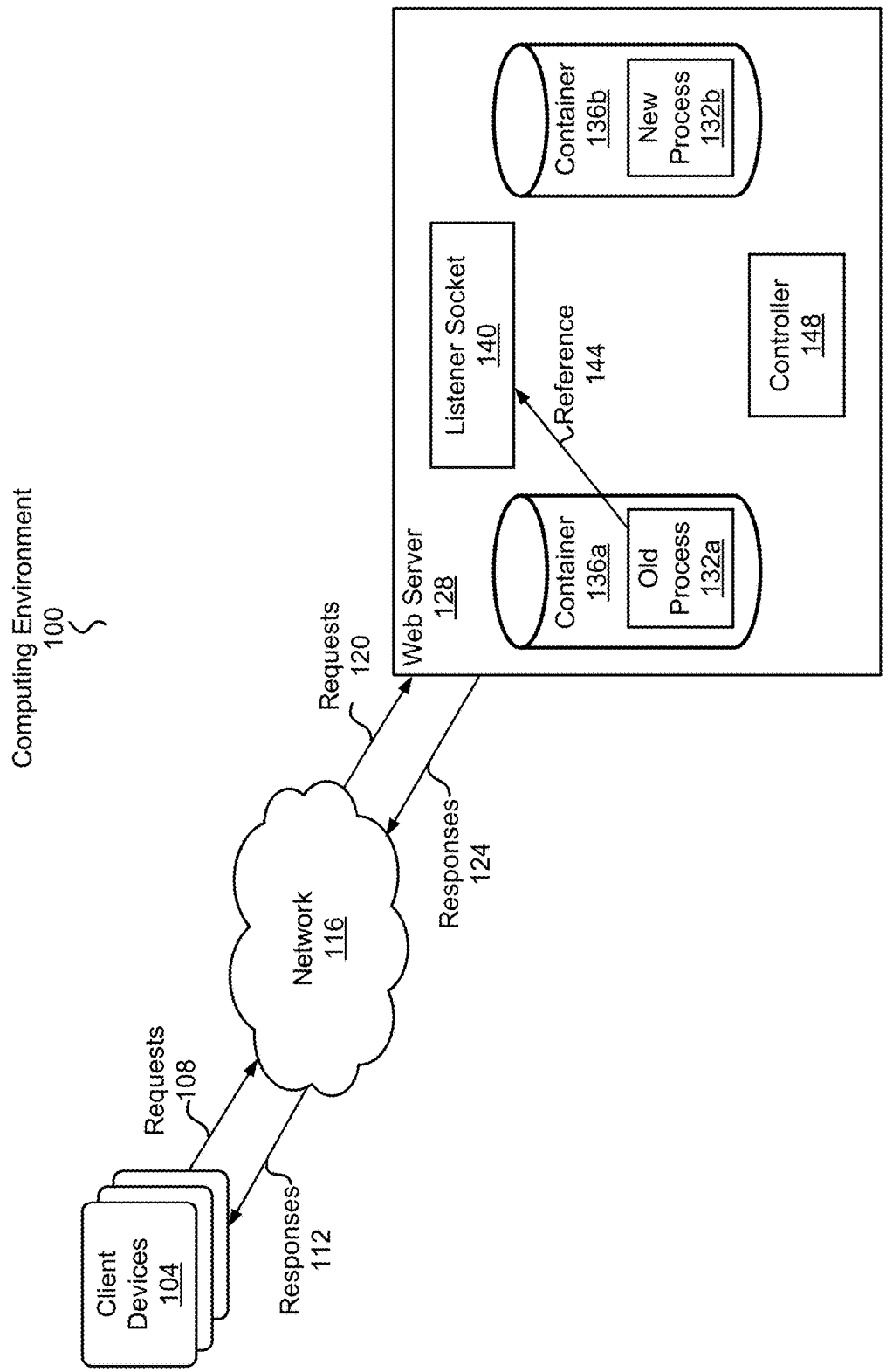
FIG. 1 is a high-level block diagram of a computing environment for passing listener sockets between processes of a web server, according to one embodiment.

Computing Environment for Passing Listener Sockets Between Processes of a Web Server FIG. 1 is a high-level block diagram of a computing environment 100 for passing listener sockets between processes of a web server 128, according to one embodiment. FIG. 1 illustrates multiple client devices 104 and a web server 128 connected by a network 116. While only a few client devices and one web server are shown in FIG. 1, embodiments of the computing environment 100 can have many such entities connected to the network 116.

FIG. 1 uses like reference numerals to identify like elements. A letter after a reference numeral, such as "136a," indicates that the text refers specifically to the element having that particular reference numeral. A reference numeral in the text without a following letter, such as "136," refers to any or all of the elements in the figures bearing that reference numeral. For example, "136" in the text refers to reference numerals "136a" and/or "136b" in the figures.

A client device 104 is an electronic device used by a user to perform functions such as consuming digital content, executing software applications, browsing web sites hosted by or otherwise interacting with the web server 128 on the network 116, and downloading files. For example, the client device 104 may be a smartphone or a tablet, notebook, or desktop computer. In addition, the client device 104 may be an Internet-of-Things (IoT)-connected device such as a home appliance, or even another web server. The client device 104 may include a display device on which the user may view digital content stored on the client device or downloaded from the web server 128. In addition, the client device 104 may include a user interface (UI), such as physical and/or on-screen buttons, with which the user may interact to perform functions such as consuming digital content, obtaining digital content, and transmitting digital content.

A client device 104 sends connection requests 108 to the web server 128 via the network 116. A request 108 seeks to access a resource maintained, controlled, or otherwise accessible by the web server 128. In one embodiment, the client device 104 sends the request 108 using a protocol. A protocol refers to a system of organizing and managing data transmission processes on the web (e.g., between computers, routers, etc.,), portioning data into message packets, addressing of data message packets, etc. For example, the client device 104 may send the request 108 using a protocol, such as the Hypertext Transfer Protocol (HTTP) or a secure variant thereof, the Dynamic Host Configuration Protocol (DHCP), Domain Name Service (DNS), File Transfer Protocol (FTP), etc. A web browser on the client device 104 may send a request 108 to the web server 128 to post or fetch a file (e.g., a web page or an image). The request 108 includes information identifying the requested resource and may also include information identifying the content to be posted, the client device 104, the server 128, and the session.

The network 116 enables communications among the client devices 104 and the web server 128. To this end, the network 116 receives requests 108 and corresponding data (e.g., contents of a file to be posted on a web page) from client devices 104 and forwards the requests 120 to the web server 128. Likewise, the network 116 receives responses 124 and corresponding data (e.g., an image to be downloaded from a web page) from the web server 128 and forwards the responses 112 to the client devices 104.

The network 116 can comprise the Internet as well as mobile telephone networks. In one embodiment, the network 116 uses standard communications technologies and/or protocols. Thus, the network 116 can include links using technologies such as Ethernet, 802.11, Long-Term Evolution (LTE), etc. The networking protocols used on the network 116 can include multiprotocol label switching (MPLS), the transmission control protocol/Internet protocol (TCP/IP), the User Datagram Protocol (UDP), HTTP, the simple mail transfer protocol (SMTP), FTP, etc. The data exchanged over the network 116 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The web server 128 receives and processes connection requests 120 from the client devices 104 and sends responses 124 back to the requesting client devices 104. In one embodiment, the web server 128 includes a listener socket 140, one or more containers 136, and a controller 148. The listener socket 140 receives the connection requests from the client devices 104 and holds the requests in a connection queue. The connection queue may hold multiple requests in the queue at a given point in time. In one embodiment, the listener socket 140 is controlled by a software kernel that executes on the web server 128.

The listener socket 140 is said to be "open" when it is accepting client requests and storing the requests in the connection queue. A listener socket 140 can be "closed" which will cause it to stop accepting requests. When the listener socket is closed, it deletes its connection queue. Thus, any client requests that are stored in the queue when the socket is closed will be dropped.

A container 136 is a software construct holding processes 132 for servicing connection requests received by the listener socket 140 and stored in the connection queue. In one embodiment, the container 136 is a virtualized execution environment. The web server 128 may simultaneously execute multiple distinct containers 136. A container 136, in turn, may execute one or more processes 132 for servicing the client requests. A container may also execute different types of processes performing different functions.

In one embodiment, a container 136 executes a router process 132. The router process 132 services the requests in the connection queue. Specifically, the router process 132 interacts with the kernel to open the listener socket 140 and receive a reference 144 thereto. Then, as it executes, the router process 132 uses the reference 144 to read requests from the connection queue, analyze the requests, and route the requests to one or more worker processes for further processing. The router process 132 removes the read requests from the queue. The worker processes may be located in one or more other containers within, or external to, the web server 128. The router process 132 may distribute requests in the connection queue among multiple worker processes based on the types of requests, for load balancing, and/or for other purposes.

From time to time it may be desirable to modify the router process 132. For example, an administrator of the web server 128 might update the router process 132 to a newer version in order to obtain better performance and/or security. Typically, this type of modification is performed by terminating the existing router process and then executing the newer version of the process.

However, modifying the router process 132 in this manner can drop requests in the connection queue. Since the router process 132 opened the listener socket 140, terminating the router process may also close the socket. Specifically, the socket will be closed if no other processes are also referencing it. As a result, any pending requests in the connection queue are dropped. "Dropped," in this context means that the connection requests are accepted into the connection queue but are never serviced by the router process 132. The dropped requests make the website appear unresponsive to the clients that made the dropped requests and therefore negatively impact the quality of service provided by the web server 128.

The controller 148 controls the operation of the web server 128. Specifically, the controller 148 provides a management interface for the web server 128. The controller 148 can perform tasks such as opening and closing listening sockets 140, instantiating and deleting containers, and configuring processes 132 within containers. In one embodiment, the controller 148 runs within the orchestration layer of the web server 128. From this layer the controller can manage the interactions among the containers 136 and other entities within the web server 128.

The controller 148 controls the operation of the web server 128 to avoid dropping requests in the connection queue when the router process 132 is modified. In one embodiment, when an existing router process 132*a* is to be modified, the controller 148 instantiates a new container 136*b* in the web server 128. The controller 148 executes the new (e.g., updated) version of the router process 132*b* in the new container 136*b*. In addition, the controller 148 uses a file descriptor shared between the new 132*b* and old 132*a* versions of the router process to pass the socket reference 144 to the new router process 132*b*. The controller 148 configures the new router process 132*b* to use the reference 144 to read the connection queue of the same listener socket 140 used by the old router process 132*a*. Once the controller 148 verifies that the new router process 132*b* is operating correctly, the controller terminates the old version of the router process 132*a*. The listener socket 140 remains open because the new router process 132*b* is referencing it.

This technique is beneficial because it passes the listener socket 140 from the old router process 132*a* to the new router process 132*b* even though the two processes are executing within different containers 136*a* and 136*b*. No incoming connection requests are dropped because the old router process 132*a* is terminated only after the controller 148 verifies that the new router process 132*b* is accepting and processing requests. There is no downtime associated with this technique because the new router process 132*b* begins accepting and processing queued requests while the old process 132*a* is executing.

This description refers to a web server running old and new router processes for purposes of clarity and simplicity. However, the techniques described herein are not limited to web servers, router processes, or different versions of a process. Rather, the techniques can be employed in any computing environment where it is desirable to pass a socket reference from a first process to a second process.

Server Architecture for Passing Listener Sockets Between Processes

Figure 2:
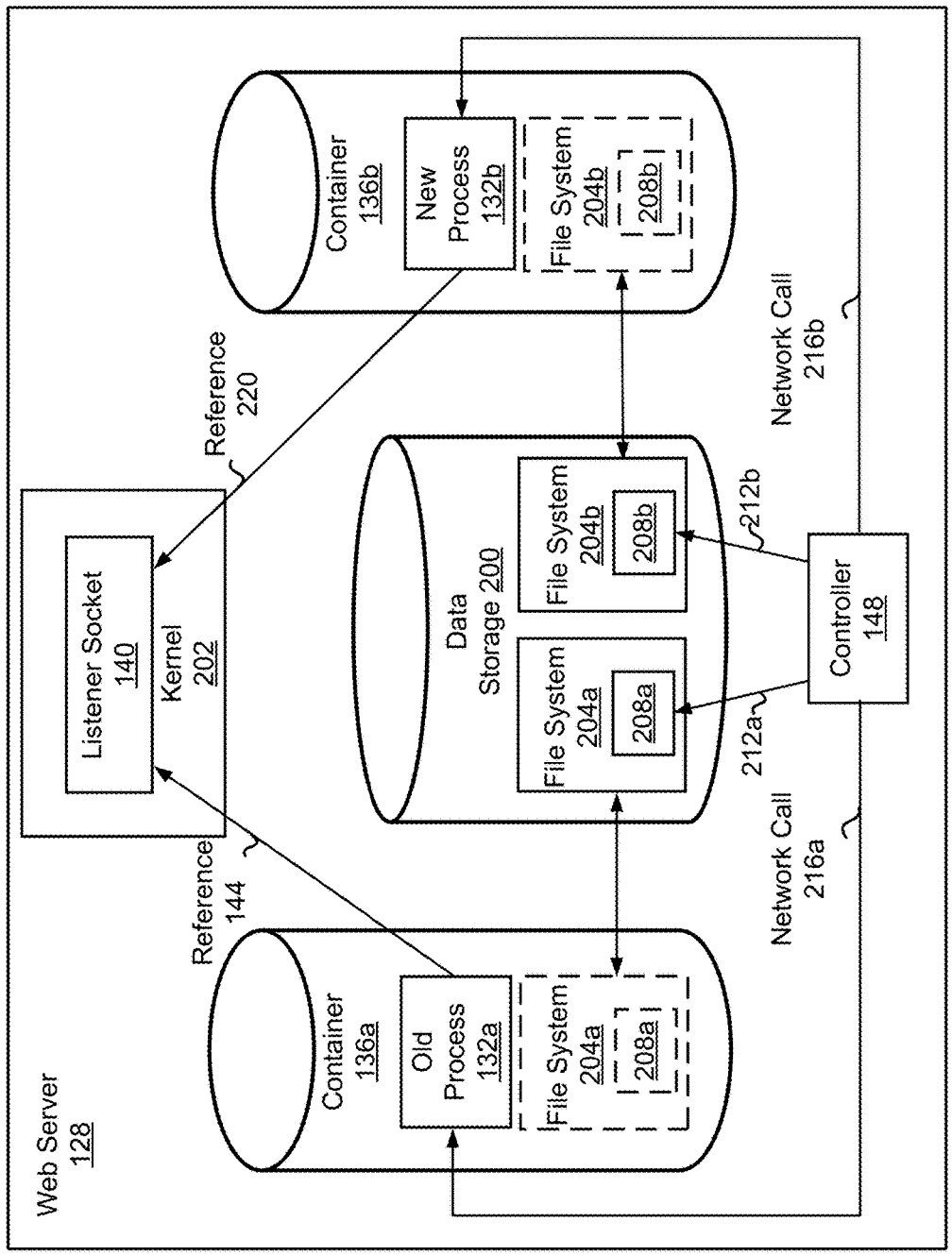
FIG. 2 is a high-level block diagram illustrating a more detailed view of the web server, according to one embodiment.

FIG. 2 is a high-level block diagram illustrating a more detailed view of the web server 128, according to one embodiment. FIG. 2 illustrates the listener socket 140, two containers 136*a* and 136*b*, and the controller 148 of FIG. 1. One container 136*a* executes the old router process 132*a* while the other container 136*b* executes the new router process 132*b*. In addition, FIG. 2 illustrates a data storage 200 including file systems 204*a* and 204*b*, and also shows that the listener socket 140 is within a kernel 202. Other embodiments of the web server 128 can have different and/or other modules than the ones described here, and the functionalities can be distributed among the modules in a different manner.

The data storage 200 is a storage subsystem used by the web server 128. The data storage 200 may encompass storage local to the web server 128. For example, the data storage may include one or more storage devices installed in a computer system providing the web server 128. The data storage 200 may also encompass storage remote from the web server 128. For example, the data storage may include portions of a storage area network or a cloud storage.

The data storage 200 includes a distinct file system 204 for each container 136. A file system 204 stores the files used by the processes executing within its respective container 136. Thus, one file system 204*a* stores files used by the container 136*a* executing the old process 132*a* while another file system 204*b* stores files used by the container 136*b* executing the new process 132*b*.

In one embodiment, the controller 148 provides the file systems 204 by designating portions of the data storage 200 for use by the respective containers. The controller 148 provides each container with a virtualized file system that maps to the respective designated portions. FIG. 2 represents these virtualized file systems 204 using dashed boxes within the containers 136. The dashed boxes have arrows pointing to the file systems 204 within the data storage 200, thereby indicating that the virtualized file systems are mapped to portions of the data storage. While the controller 148 typically maps file systems 204 of different containers 136 to different portions of the data storage 200, the controller can also map at least some of the file systems to a same portion of the storage. Thus, one file in the data storage 200 can appear in file systems of two containers 136 if both containers' file systems 204 include the location of the file in the data storage.

The kernel 202 is a portion of the operating system of the web server 128 and performs various system-level tasks. One such task is managing listener sockets, including opening and closing such sockets. The listener sockets may be referenced by their file descriptors. In addition, domain sockets are represented as socket files in the data storage 200. A domain socket is a data communications endpoint for exchanging data between processes executing on the same host operating system. The kernel receives requests from a process to open a socket and creates the socket. In the case of a domain socket, the kernel creates a socket file in the data storage 200. The kernel returns a file descriptor referencing the socket to the requesting process. The file descriptor serves as the reference to the socket. A domain socket may also be referenced as a path to the socket file in the data storage 200. In the context of FIG. 2, the old process 132*a* interacted with the kernel 202 to open the listener socket 140, and is using the returned reference 144 to service the connection queue for the socket.

Generally, the controller 148, and the modules within the controller, communicate with other entities within the web server 128 via application programming interface (API) calls 216. The controller 148 uses the API calls to invoke functions in the kernel 202, containers 136, processes within the containers 132, and file system 200. Thus, the various operations described below are performed by the controller making API calls to the appropriate entity or entities.

In order to configure the new router process 132*b* to access the connection queue of the listener socket 140, the controller 148 causes the old router process 132*a* to open a domain socket, which is a data communications endpoint for exchanging data between processes. The kernel 202 opens the domain socket and represents the socket as a file 208*a* in the old router processes' file system 204*a*. This file 208*a* is actually stored in data storage 200 at a location mapped to the file system 204*a* of the container 136*a* executing the old router process 132*a*. In addition, the controller 148 causes the old router process 132*a* to write the reference 144 to the listener socket to the file 208*a* representing the domain socket 208*a*.

The controller 148 configures the file system 204*b* for the container 136*b* containing the new router process 132*b* to include the portion of the data storage 200 containing the file 208 representing the domain socket created by the old router process 132*a*. Thus, the file is accessible to both the old router process 132*a* and the new router process 132*b* via the processes' respective file systems 204.

The controller 148 causes the new router process 132*b* to read the file 208*b* representing the domain socket from its own file system 204*b*. In this way, the new router process 132*b* acquires the reference 144 used by the old router process 132*a* to access the connection queue of the listener socket 140.

The new router process 132*b* then begins accepting and processing connection requests from the connection queue of the listener socket 140. The old 132*a* and new 132*b* router processes operate in parallel, with each process servicing different connection requests in the queue. Therefore, the processes 132*a* and 132*b* simultaneously accept and process requests from the connection queue for a period of time.

The controller 148 verifies that the new router process 132*b* is functioning normally. Then, the controller 148 shuts down the old router process 132*a*. The controller 148 instructs the old router process 132*a* to complete processing existing connection requests 120 that have already been accepted by the process 132*a*. The controller 148 also instructs the process 132*a* to stop accepting new connection requests incoming to the listener socket 140. Once the existing connection requests 120 accepted by process 132*a* have completed processing, the controller 148 terminates the process 132*a*.

When the old router process 132*a* is terminated, the kernel 202 keeps the listener socket 140 open because the socket is being referenced by the new router process 132*b*. Therefore, no connection requests in the listener socket 140 connection queue are dropped. The web server 128 is thereby upgraded without negatively impacting the operation of the web server.

Controller for Passing Listener Sockets Between Processes of a Web Server

Figure 3:
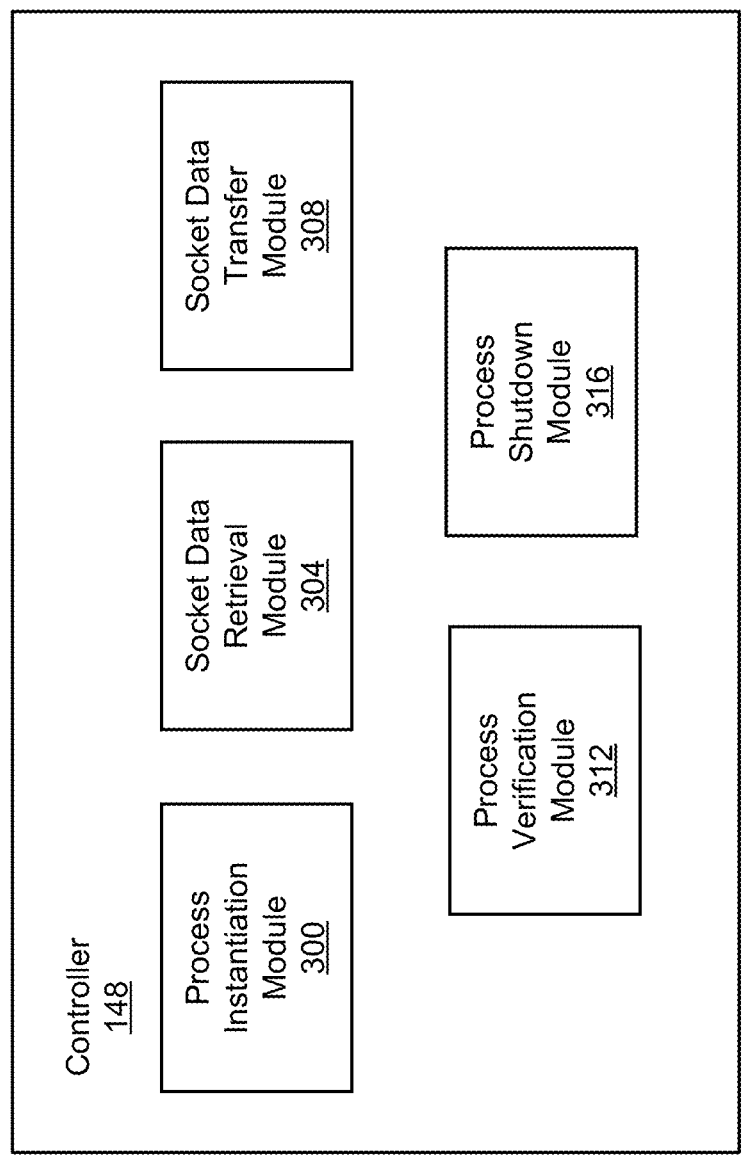
FIG. 3 is a high-level block diagram illustrating components of a controller for passing listener sockets between processes, according to one embodiment.

FIG. 3 is a high-level block diagram illustrating components of the controller 148, according to one embodiment. FIG. 3 illustrates that the controller 148 includes a process instantiation module 300, a reference transfer module 302, a process verification module 304, and a process shutdown module 306. Other embodiments of the controller 148 can have different and/or other modules than the ones described here, and the functionalities can be distributed among the modules in a different manner.

For purposes of this description, assume that the web server 128 is operating on the network 116 and an old router process 132*a* is servicing connection requests in the connection queue of an open listener socket 140. Also assume that an administrator of the web server 128 seeks to update the web server by switching from the old router process 132*a* to a new router process 132*b*. The administrator may perform this update, for example, by interacting with a control interface provided by the controller 148. These interactions cause the modules within the controller to operate as described below.

The process instantiation module 300 instantiates a new router process 132*b* within a container 136*b*. In response to the request to upgrade the old router process 132*a* to a new router process 132*b*, the process instantiation module 300 creates the container 136*b* for executing the new router process 132*b*, and executes the new router process 132*b* within this container. The process instantiation module 300 also maps a portion of the data storage 200 as a file system 204*b* for the new container 136*b*. At least part of the file system 204*b* for the new container overlaps with the file system 204*a* used by the container 136*a* in which the old router process 132*a* executes.

The reference transfer module 302 transfers the reference 144 to the listener socket 140 used by the old router process 132*a* to the new router process 132*b*. The reference transfer module 302 causes the old router process 132*a* to open a domain socket, which is represented as a file 208 at a location within the file systems 204 of both the container 136*a* of the old router process and the container 136*b* of the new router process 132*b*. The reference transfer module 302 may perform this task by mounting the portion of the data storage 200 containing the domain socket file 208 in the file systems 204 of both containers 136.

The reference transfer module 302 causes the old router process 132*a* to write the file descriptor for the listener socket 140 to the domain socket 208. The old router process 132*a* may also write additional information such as IP addresses, ports, and the software version of the old router process to the domain socket 208. The reference transfer module 302 then causes the new router process 132*b* to read the file descriptor for the listener socket 140 and any additional information from the domain socket 208. The new router process 132*b* accomplishes this task by reading the information from the domain socket file 208*b* within its file system 204*b*.

The reference transfer module 302 causes the new router process 132*b* to use the file descriptor read from the domain socket file 208*b* to service connection requests in the queue of the listener socket 140.

The process verification module 304 verifies that the new router process 132*b* is running correctly. Specifically, the process verification module 304 verifies that the new router process 132*b* is successfully servicing the connection requests in the connection queue and/or performing other desired functionality. The process verification module 304 may perform this verification by making operating system calls, monitoring network traffic, or using any existing monitoring interfaces of the web server 128.

The process shutdown module 306 shuts down (i.e., terminates) the old router process 132*a*. In one embodiment, the process shutdown module 306 receives an output from the process verification module 304 indicating whether the new router process is running correctly. If running correctly, the process shutdown module 306 instructs the old router process 132*a* to complete processing of any accepted connection requests and stop servicing new connection requests from the connection queue. The process shutdown module 316 then terminates the process 132*a*. The process shutdown module 316 may also delete the container 136*a* for the old router process 132*a*.

Process for Passing Listener Sockets Between Processes of a Web Server

Figure 4:
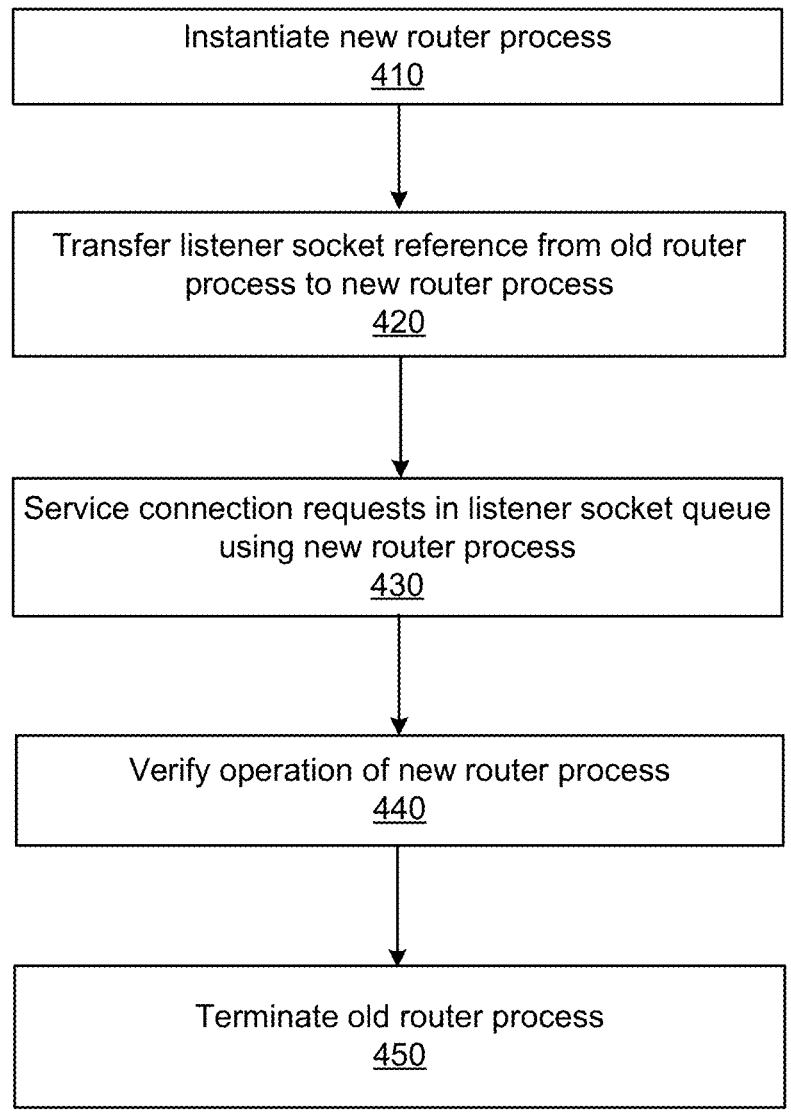
FIG. 4 is a flowchart illustrating steps performed to pass listener sockets between processes of a web server, according to one embodiment.

FIG. 4 is a flowchart illustrating steps performed to pass listener sockets between processes of a web server 128, according to one embodiment. The steps of FIG. 4 may be performed by the controller 148. Some or all of the steps may be also performed by other entities. Likewise, the controller 148 may perform the steps in different orders, and/or perform different or additional steps.

The new router process 132*b* is instantiated 410. For example, the controller 148 may create a new container 136*b* in the web server 128 and execute the new router process 132b within it. As part of this task a file system 204b for the container 136b and/or process 132b is also instantiated.

The old router process 132a transfers 420 its reference 144 to the listener socket 140 to the new router process 132b. Specifically, the old router process 132a opens a domain socket which is represented as a file 208a in its file system 204a. This file 208b is also present in the file system 204b of the new router process 132b. The old router process 132a writes the reference 144 to the listener socket 140 to the domain socket file 208a. The new router process 132b reads the reference 144 to the listener socket 140 from the domain socket file 208b.

The new router process 132b uses the reference to service 430 connection requests in the connection queue of the listener socket 140. Therefore, the old 132a and new 132b processes concurrently service requests 120 from the connection queue for a period of time, with each process servicing a different set of requests.

The controller verifies 440 that the new router process 132b is operating correctly. This verification 440 may involve various actions, such as, but not limited to, making operating system calls, monitoring network traffic, or using any existing monitoring interfaces of the web server 128. If the new router process 132b is operating correctly, the old router process 132a is terminated 450. The container 136a in which the old router process 132a was executing may also be deleted.

Example Machine for Passing Listener Sockets Between Processes of a Web Server

Figure 5:
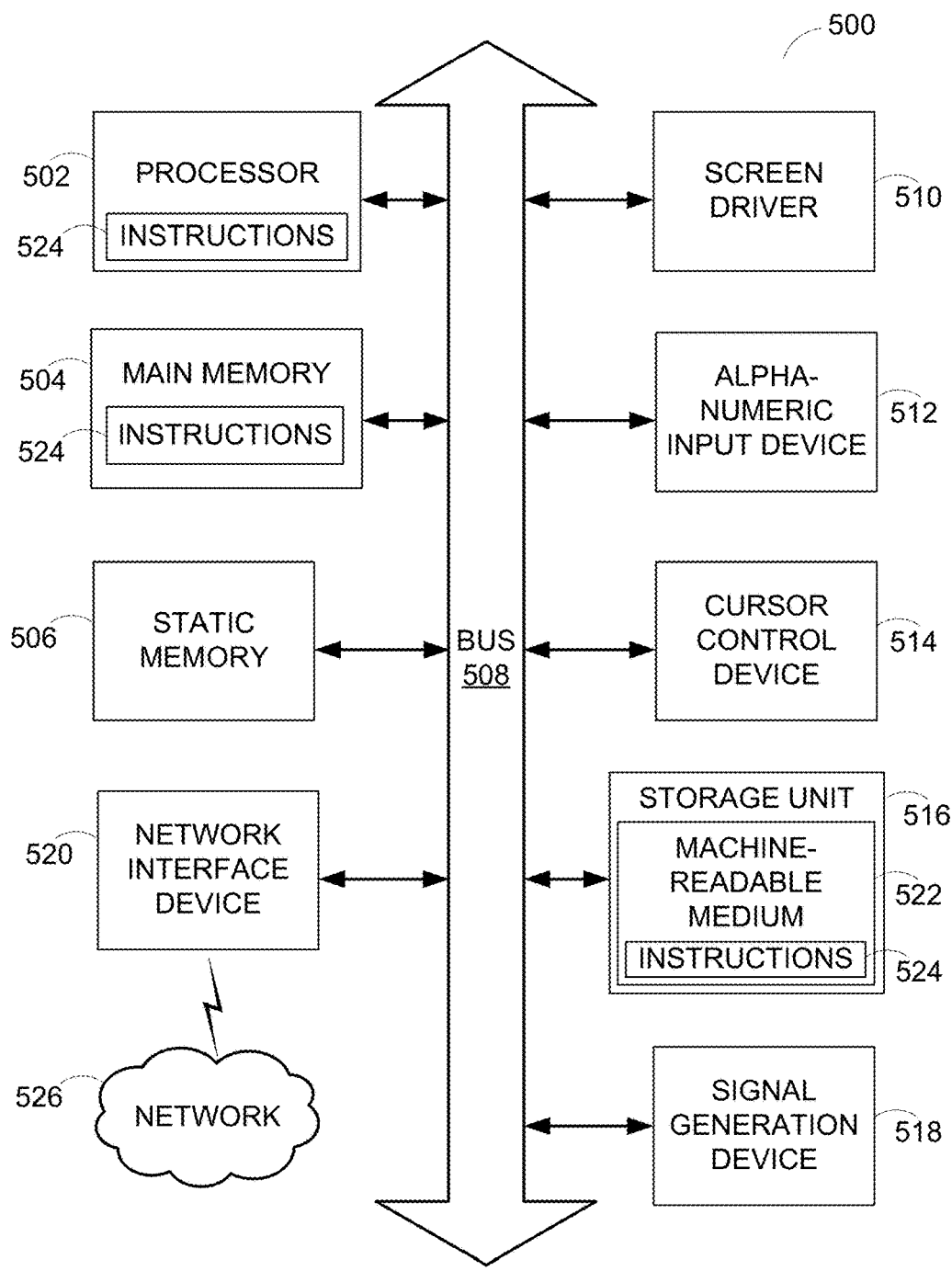
FIG. 5 illustrates components of an example machine able to read instructions to pass listener sockets between processes of a web server, according to one embodiment.

FIG. 5 illustrates components of an example machine 500 able to read instructions for passing listener sockets between processes of a web server, according to one embodiment. Those of skill in the art will recognize that other embodiments of the machine 500 can have different and/or other modules than the ones described here, and that the functionalities can be distributed among the modules in a different manner.

Specifically, FIG. 5 shows a diagrammatic representation of a machine in the example form of a computer system 500. The computer system 500 can be used to execute instructions 524 (e.g., program code modules) that cause the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a cloud server residing on a shared "virtualized" environment managed by a cloud hosting provider, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., program code modules) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any non-transitory medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for processing connection requests implemented by a web server device, the method comprising:
  instantiating a reference to a listener socket, within a data storage accessible to a first process and a second process, the reference to the listener socket comprising a file descriptor and being represented by a file in a first file system in communication with the first process and the listener socket queueing connection requests from clients on a network;
  mapping a second file system, in communication with the second process, based on the file representing the reference to the listener socket and writing the file descriptor to a domain socket, to make the connection requests queued by the listener socket accessible to the second process;
  servicing, by the second process, the connection requests queued by the listener socket; and terminating the first process following verification that the second process is servicing the connection requests queued by the listener socket.

2. The method of claim 1, wherein a controller in communication with first process and the second process initiates the instantiation, mapping, and termination.

3. The method of claim 1, wherein the first process is a first router process, the second process is a second router process, and the method further comprises servicing, by the first router process, a first set of connection requests queued by the listener socket.

4. The method of claim 1, wherein the first process is executing within a first container, and the method further comprises instantiating the second process within a second container, the second container distinct from the first container.

5. The method of claim 1, wherein the first and second file systems are stored by the data storage and the method further comprises mounting a portion of the data storage into the second file system.

6. A non-transitory computer readable medium having stored thereon instructions for processing connection requests comprising machine executable code which when executed by at least one processor, causes the processor to:
   instantiate a reference to a listener socket, within a data storage accessible to a first process and a second process, the reference to the listener socket comprising a file descriptor and being represented by a file in a first file system in communication with the first process and the listener socket queueing connection requests from clients on a network;
   map a second file system, in communication with the second process, based on the file representing the reference to the listener socket and writing the file descriptor to a domain socket, to make the connection requests queued by the listener socket accessible to the second process;
   service, by the second process, the connection requests queued by the listener socket; and
   terminate the first process following verification that the second process is servicing the connection requests queued by the listener socket.

7. The non-transitory computer readable medium as set forth in claim 6, wherein a controller in communication with first process and the second process initiates the instantiation, mapping, and termination.

8. The non-transitory computer readable medium as set forth in claim 6, wherein the first process is a first router process, the second process is a second router process and the machine executable code, when executed by the processor, further causes the processor to service, by the first router process, a first set of connection requests queued by the listener socket.

9. The non-transitory computer readable medium as set forth in claim 6, wherein the first process is executing within a first container and the machine executable code, when executed by the processor, further causes the processor to instantiate the second process within a second container, the second container distinct from the first container.

10. The non-transitory computer readable medium as set forth in claim 6, wherein the first and second file systems are stored by the data storage and the machine executable code, when executed by the processor, further causes the processor to mount a portion of the data storage into the second file system.

11. A web server device, comprising memory comprising programmed instructions stored in the memory and one or more processors configured to execute the stored programmed instructions to:
   instantiate a reference to a listener socket, within a data storage accessible to a first process and a second process, the reference to the listener socket comprising a file descriptor and being represented by a file in a first file system in communication with the first process and the listener socket queueing connection requests from clients on a network;
   map a second file system, in communication with the second process, based on the file representing the reference to the listener socket and writing the file descriptor to a domain socket, to make the connection requests queued by the listener socket accessible to the second process;
   service, by the second process, the connection requests queued by the listener socket; and
   terminate the first process following verification that the second process is servicing the connection requests queued by the listener socket.

12. The web server device as set forth in claim 11, wherein a controller in communication with first process and the second process initiates the instantiation, mapping, and termination.

13. The web server device as set forth in claim 11, wherein the first process is a first router process, the second process is a second router process and the processors are further configured to execute the stored programmed instructions to service, by the first router process, a first set of connection requests queued by the listener socket.

14. The web server device as set forth in claim 11, wherein the first process is executing within a first container and the processors are further configured to execute the stored programmed instructions to instantiate the second process within a second container, the second container distinct from the first container.

15. The web server device as set forth in claim 11, wherein the first and second file systems are stored by the data storage and the processors are further configured to execute the stored programmed instructions to mount a portion of the data storage into the second file system.

* * * * *